United States Patent [19]
Mistry et al.

[11] Patent Number: 6,015,896
[45] Date of Patent: Jan. 18, 2000

[54] PHTHALOCYANINE COMPOUNDS

[75] Inventors: Prahalad Manibhai Mistry, Ashton-Under-Lyne; Ronald Wynford Kenyon, Bridport, both of United Kingdom

[73] Assignee: Zeneca Limited, London, United Kingdom

[21] Appl. No.: 09/051,268

[22] PCT Filed: Sep. 20, 1996

[86] PCT No.: PCT/GB96/02297

§ 371 Date: Apr. 7, 1998

§ 102(e) Date: Apr. 7, 1998

[87] PCT Pub. No.: WO97/13811

PCT Pub. Date: Apr. 17, 1997

[30] Foreign Application Priority Data

Oct. 7, 1995 [GB] United Kingdom .................. 9520490

[51] Int. Cl.$^7$ .................. C09D 11/02; C09D 487/22; C09B 47/04
[52] U.S. Cl. .................. 540/134; 540/122; 540/123; 540/124; 540/125; 540/131; 540/133; 540/139; 106/22
[58] Field of Search ..................... 540/123, 122, 540/124, 125, 131, 133, 134, 139

[56] References Cited

U.S. PATENT DOCUMENTS 3,989,692  11/1976  Jager et al. ..................... 260/242

FOREIGN PATENT DOCUMENTS

| | | |
|---|---|---|
| 114 325 | 8/1984 | European Pat. Off. . |
| 174 586 | 3/1986 | European Pat. Off. . |
| 196 901 | 10/1986 | European Pat. Off. . |
| 418 792 | 3/1991 | European Pat. Off. . |
| 1 368 650 | 12/1964 | France . |
| 1 064 661 | 9/1959 | Germany . |
| 1 569 783 | 7/1969 | Germany . |
| 196901 | 10/1986 | Japan . |
| 418792 | 3/1991 | Japan . |

*Primary Examiner*—Mukund J. Shah
*Assistant Examiner*—Pavanaram K Sripada
*Attorney, Agent, or Firm*—Pillsbury Madison & Sutro LLP

[57] ABSTRACT

A compound of formula (1) and salts thereof, wherein: M is a metal or hydrogen; Pc is phthalocyanine nucleus; $R^1$, $R^2$, $W^1$ and $W^2$ are each independently H or optionally substituted alkyl, aryl or aralkyl; $R^3$ is an aminoalkyl group; L is a divalent organic linking group; x, y and t are each independently 0.5 to 2.5; and (x+y+t) is from 3 to 4. A process for making the compounds of formula (1). The compounds of formula (1) are useful as colorants for inks which are used in for example ink jet printing of substrates such as paper, plastics, textile materials, metal or glass.

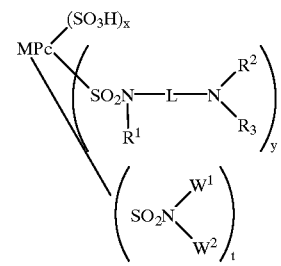

(1)

12 Claims, No Drawings

PHTHALOCYANINE COMPOUNDS

This application is a 371 of PCT/GB 96/02297 filed Sep. 20, 1996.

This invention relates to coloured phthalocyanine compounds, inks, their preparation and use. The compounds are particularly useful as the coloured component of ink jet printing inks.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good water fastness, light fastness and optical density, have fast fixation to the substrate and cause no clogging of the nozzle.

According to a first aspect of the present invention there is provided a colorant of the Formula (1) and salts thereof:

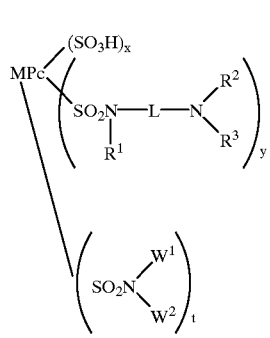

Formula (1)

wherein:

M is a metal or hydrogen;

Pc is a phthalocyanine nucleus;

$R^1$, $R^2$, $W^1$ and $W^2$ each independently is H or optionally substituted alkyl, aryl or aralkyl;

$R^3$ is an aminoalkyl group;

L is a divalent organic linking group;

x, y and t are each independently 0.5 to 2.5; and (x+y+t) is from 3 to 4.

M is preferably copper, nickel, scandium, titanium, vanadium, chromium, manganese, iron, cobalt, zinc, lithium, sodium, potassium, magnesium, calcium, barium, aluminium, silicon, tin, lead or rhodium more preferably copper, nickel, scandium, titanium, vanadium, chromium, manganese, iron, cobalt or zinc, especially copper or nickel and more especially copper. When M is tri- or tetra-valent the valencies above 2 may be taken by coordination with halogen atoms or oxygen e.g. VO, AlCl, $PbCl_2$.

$R^1$, $R^2$, $W^1$ and $W^2$ are preferably H; optionally substituted $C_{1-4}$-alkyl, especially $C_{1-4}$-alkyl; optionally substituted phenyl; $C_{7-11}$-aralkyl, especially benzyl. It is particularly preferred that $R^1$ is H, $R^2$ is H or $C_{1-4}$-alkyl and $W^1$ and $W^2$ are each independently H or $C_{1-4}$-alkyl.

The divalent organic linking group represented by L in Formula (1) is preferably alkylene, especially $C_{1-6}$-alkylene, more especially $C_{2-4}$-alkylene; aralkylene, preferably $C_{7-11}$-aralkylene, especially phenyl-$C_{1-4}$-alkylene; or arylene, preferably arylene having up to ten carbon atoms, especially phenylene; which may be substituted or unsubstituted.

As examples of alkylene and aralkylene groups represented by L, there may be mentioned:

ethylene
1,2- and 1,3-propylene
2-hydroxy -1,3-propylene
1- and 2-phenyl-1,3-propylene
2-(4'-sulphophenyl)-1,3-propylene
1,4-, 2,3- and 2,4-butylene
2-methyl-1,3-propylene
2-methyl-2,4-pentylene
2,2-dimethyl-1,3-propylene
1-phenylethylene
1-chloro-2,3-propylene
1,6- and 2,5-hexylene
2,3-diphenyl-1,4-butylene
1-(methoxycarbonyl)-1,5-pentylene
1-carboxy-1,5-pentylene
2,7-heptylene
3-methyl-1,6-hexylene
—$CH_2CH_2OCH_2CH_2$—
—$CH_2CH_2SCH_2CH_2$—
—$CH_2CH_2SSCH_2CH_2$—

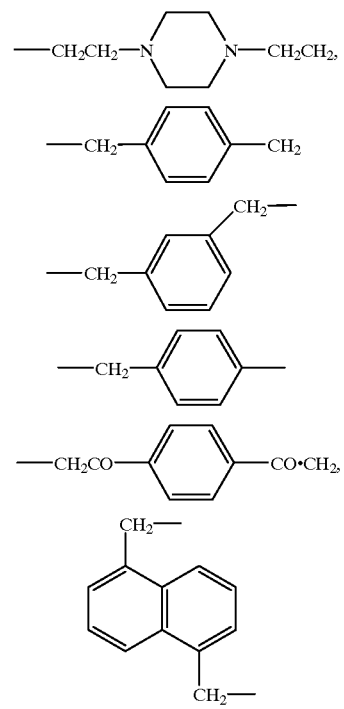

As examples of arylene radicals represented by L there may be mentioned 1,2-, 1,3- and 1,4-phenylene and 1,4-naphthylene which are optionally sulphonated.

It is particularly preferred that L is an optionally substituted $C_2$-$C_6$-alkylene group, more preferably a group of the Formula —$C_nH_{2n}$— wherein n is 2 to 6. It is preferred that n is 2 to 4, more preferably n is 2.

$R^3$ can be a primary, secondary or tertiary aminoalkyl group, preferably a group of the Formula —$C_nH_{2n}$-$NR^4R^5$ wherein n is as hereinbefore defined and $R^4$ and $R^5$ each independently is H; optionally substituted alkyl, aryl or aralkyl; or $R^4$ and $R^5$ together with the nitrogen atom to which they are attached form a 5 or 6 membered ring other than a piperazino ring.

Preferably $R^4$ and $R^5$ each independently is H, optionally substituted $C_{1-4}$-alkyl, phenyl or benzyl, more preferably H or $C_{1-4}$-alkyl, especially methyl.

When $R^4$ and $R^5$ together with the nitrogen to which they are attached form a 5 or 6 membered ring they preferably form a pyridine, piperidine or morpholine ring, more preferably a morpholine ring.

As examples of group s represented by $R^3$ there may be mentioned:
—$CH_2CH_2NH_2$
—$CH_2CH_2NHCH_2CH_3$
—$CH_2CH_2N(CH_3)_2$
—$CH_2CH_2NHCH_2CH_2CH_3$
—$CH_2CH_2CH_2NH_2$

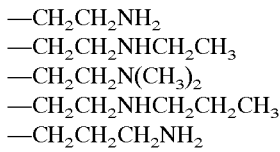

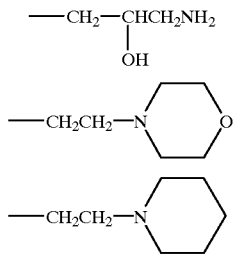

When $R^1$, $R^2$, $R^3$, $R^4$, $R^5$, $W^1$, $W^2$ or L is optionally substituted, the substituent(s) is or are preferably selected from H; alkyl, preferably $C_{1-4}$-alkyl and especially methyl; alkoxy, preferably $C_{1-4}$-alkoxy and especially methoxy; carboxy; sulpho; —OH; amino; —CN; —$NO_2$; and halo.

It is preferred that x is from 0.8 to 2. Preferred values of y are from 1 to 2. Preferred values of t are from 0.8 to 2.

The sum of (x+y+t) is preferably 4.

It is to be understood that colorants of the present invention include not only compounds of Formula (1) but also mixtures of compounds of Formula (1) and the salts thereof. Preferred salts are those with an alkali metal, particularly $Na^+$, $Li^+$ or $K^+$ or a substituted ammonium cation.

The substituted ammonium cation may be a quaternary ammonium group of the Formula $^+NQ_4$ in which each Q independently is an organic radical, or two or three Qs together with the nitrogen atom to which they are attached form a heterocyclic ring and all remaining Qs are selected from $C_{1-4}$-alkyl. Preferred organic radicals represented by Q are $C_{1-4}$-alkyl radicals, especially methyl. Preferred heterocyclic rings formed by $NQ_4$ are 5 or 6 membered heterocyclic rings.

As examples of quaternary ammonium groups of Formula $^+NQ_4$ there may be mentioned $N^+(CH_3)_4$, $N^+(CH_2CH_3)_4$, N-methyl pyridinium, N,N-dimethyl piperidinium and N,N-dimethyl morpholinium.

Alternatively the substituted ammonium cation may be a group of Formula $^+NHT_3$ wherein each T independently is H or $C_{1-4}$-alkyl, or two or three groups represented by T together with the nitrogen atom to which they are attached form a 5 or 6 membered ring, especially a pyridine, piperidine or morpholine ring.

As examples of groups of Formula $^+NHT_3$ there may be mentioned $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $^+NH_4$, $(CH_3)_2CHN^+H_3$, pyridinium, piperidinium and morpholinium.

According to a further aspect of the present invention there is provided a process for the preparation of a colorant of Formula (1) which comprises condensing a compound of the Formula (2) with a compound of the Formula (3), preferably in the presence of a base:

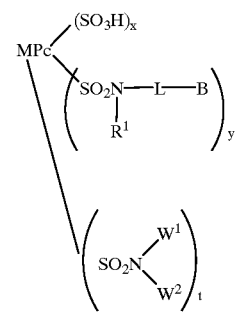

Formula (2)

Formula (3)

wherein:
B is a labile atom or a labile group; and
M, Pc, $R^1$, L, $R^2$, $R^3$, $W^1$, $W^2$, x, y and t are as hereinbefore defined.

Preferred labile atoms represented by B are halogens, especially Cl and Br, and a preferred labile group represented by B is $OSO_3H$.

The base may be any inorganic or organic base such as an alkali metal or alkali earth metal hydroxide, carbonate or bicarbonate or an organic base, for example the compound of Formula (3). Preferred organic bases are tertiary amines such as N-alkylated heterocycles, for example N-($C_{1-4}$-alkyl)morpholine, N-($C_{1-4}$-alkyl)piperidine, and N,N-di($C_{1-4}$-alkyl)piperidine; tri($C_{1-4}$-alkyl)amines, for example triethylamine; and optionally substituted pyridines, especially unsubstituted pyridine.

The amount of base used may be varied between wide limits but it is preferred to use less than 40, more preferably less than 10 and especially from 3 to 5 moles of base for each mole of the compound of Formula (2).

The condensation is preferably performed using water as solvent. Ambient temperatures may be employed in conjunction with a reaction time of, for example, 5–24 hours, or elevated temperatures of from 30° C. to 150° C., preferably from 50° C. to 100° C. can be used for a shorter period.

After the condensation the product may be isolated by acidifying the reaction mixture, preferably using a mineral acid, especially hydrochloric acid. Where the product precipitates as a solid it may be separated from the mixture by filtration.

If desired unwanted anions may be removed from the product of the above process by dialysis, reverse osmosis, ultrafiltration or a combination thereof.

The product of the above process may be converted, where necessary, to the alkali metals $NH_4^+$, quaternary ammonium or organic amine salt by the addition of ammonia, ammonium hydroxide, primary, secondary, tertiary or quaternary amine. When the base used in the condensation process is an organic amine an excess may be used so that the sulpho groups in the compound of Formula (1) are converted into their organic amine salt in situ.

The compounds of Formula (2) may be prepared by stepwise condensation of a compound of Formula MPc $(SO_2B)_{x+y+t}$ with a compound of Formula $HNR^1$-L-B and a compound of Formula $HNW^1W^2$, preferably in an aqueous medium, wherein M, Pc, B, $R^1$, L, $W^1$, $W^2$, x, y and t are as hereinbefore defined. The condensation leading to the compound of Formula (2) is preferably performed in the presence of base.

The abovementioned compound of Formula MPc $(SO_2B)_{x+y+t}$ may be prepared using known methods, for example by heating a metal-free or metal-containing phthalocyanine optionally having three to four sulpho groups with chlorosulphonic acid, optionally followed by heating with $PCl_3$. Typically the heating with chlorosulphonic acid is performed above 60° C., preferably above 100° C., especially in the range 120° C. to 165° C., preferably over a period of from 1 to 24 hours. Heating with $PCl_3$ is preferably performed at a lower temperature, especially 80–105° C., over a period of 10 to 48, preferably 10 to 30 hours.

As a result of $R^3$ being an aminoalkyl group the compound of Formula (3) contains at least two amino groups. Consequently when the compound of Formula (3) is an unsymmetrical diamine, e.g. $H_2NCH_2CH_2NHCH_3$, a mixture of compounds results because either end of the unsymmetrical diamine can react with the compound of Formula (2).

Examples of compounds of Formula (3) which may be used in the above process include N,N-dimethylaminoethylamine, 2-(2-aminoethylamino)ethanol, N-(aminoethyl)morpholine, 1,2-diaminoethane, N-(3-aminopropyl)morpholine, N,N-dimethylamino propylamine, 1,2-diaminopropane, 1,3-diaminopropane and N,N-diethylaminoethylamine.

The product of the above process forms a further feature of the present invention.

The compounds of Formula (1) are especially useful for the preparation of inks and accordingly there is provided an ink comprising a compound of Formula (1) or salt thereof and a medium, especially aqueous inks, used in ink jet printing and particularly thermal ink jet printing. The inks can be prepared according to known formulations. The compounds have high water fastness when printed onto paper, even when in the form of a salt with a metal (e.g. Na, K). Thus it is preferred to use the free acid or metal salts of the compounds of Formula (1) rather than the potentially unpleasant odorous amine salts to achieve good fastness results.

A preferred ink comprises a compound of Formula (1) and a liquid medium, preferably an aqueous medium. It is preferred that the colorant is completely dissolved in the liquid medium to form a solution.

The ink preferably contains from 0.5% to 20%, more preferably from 0.5% to 15%, and especially from 1% to 5%, by weight of the compound of Formula (1), based on the total weight of the ink. Although the ink may contain less than 5% by weight of the compound of Formula (1) it is desirable that the dye has a solubility of around 10% or more to allow the preparation of concentrates which may be used to prepare more dilute inks and to minimise the chance of precipitation of the compound of Formula (1) if evaporation of the medium occurs during use.

The liquid medium is preferably water or a mixture comprising water and a water-soluble organic solvent, preferably in a weight ratio from 99:1 to 1:99, more preferably from 95:1 to 50:50 and especially from 90:10 to 60:40.

The water-soluble organic solvent is preferably a $C_{1-4}$-alkanol such as methanol, ethanol, n-propanol, isopropanol, n-butanol, sec-butanol, tert-butanol or isobutanol; an amide such as dimethylformamide or dimethylacetamide; a ketone or ketone alcohol such as acetone or diacetone alcohol; an ether such as tetrahydrofuran or dioxane; a polyalkylene glycol such as polyethylene glycol or polypropylene glycol; an alkylene glycol or thioglycol containing a $C_2$–$C_6$ alkylene group such as ethylene glycol, propylene glycol, butylene glycol or triethylene glycol; a thiodiglycol, hexylene glycol, or diethylene glycol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol; 2-pyrrolidone or N-methylpyrrolidone; or a mixture containing two or more of the aforementioned water-soluble organic solvents.

Preferred water-soluble organic solvents are selected from 2-pyrrolidone, N-methylpyrrolidone, an alkylene glycol or lower alkyl ether of a polyhydric alcohol such as ethylene glycol, diethylene glycol, triethylene glycol or 2-methoxy-2-ethoxy-2-ethoxyethanol; and a polyethylene glycol with a molecular weight of up to 500. A preferred specific solvent mixture is a binary mixture of water and either diethylene glycol, 2-pyrrolidone or N-methylpyrrolidone in a weight ratio as mentioned above.

Examples of suitable ink media are given in U.S. Pat. No. 4,963,189, U.S. Pat. No. 4,703,113, U.S. Pat. No. 4,626,284 and EP 4,251,50A.

It is preferred that the inks of the present invention further comprise one or more of a penetrant to assist permeation of the dye into a paper substrate and a buffer such as sodium borate, to stabilise the pH of the ink.

A further aspect of the present invention provides a process for printing a substrate with an ink using an ink jet printer, characterised in that the ink contains at least one compound of Formula (1) or salt thereof.

A suitable process for the application of an ink as hereinbefore defined comprises forming the ink into small droplets by ejection from a reservoir through a small orifice so that the droplets of ink are directed at a substrate. This process is commonly referred to as ink jet printing, and the ink jet printing processes for the present inks are preferably piezoelectric ink jet printing, and more especially thermal ink jet printing. In thermal ink jet printing, programmed pulses of heat are applied to the ink by means of a resistor, adjacent to the orifice during relative movement between the substrate and the reservoir.

Substrates may be paper, plastics, textiles, metal or glass. Preferred substrates are overhead projector slides or cellulosic substrates, especially plain paper, which may have an acid, alkaline or neutral character.

The preferred ink used in the process is as hereinbefore described.

According to a still further aspect of the present invention there is provided a paper or an overhead project slide printed with a compound of Formula (1) or salt thereof.

According to a further aspect of the present invention there is provided a process for the coloration of a textile material with any of the abovementioned ink compositions comprising a compound of Formula (1) which comprises the steps:

i) applying to the textile material by ink jet printing the ink composition; and ii) heating the textile material at a temperature from 50° C. to 250° C. to fix the dye on the material.

The process for coloration of a textile material by ink jet printing preferably comprises a pre-treatment of the textile material with an aqueous pre-treatment composition comprising a water-soluble base, a hydrotropic agent and a thickening agent followed by removing water from the pre-treated textile material to give a dry pre-treated textile material which is subjected to ink jet printing in step i) above.

The pre-treatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide, The amount of base may be varied within wide limits provided sufficient base is retained on the textile material after pre-treatment to promote the dyeing of the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (d) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xanthan gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The remainder of the pre-treatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN (available from ICI), which have a strong affinity for the textile material and the dye and thus increase the fixation of the dye on the textile material.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pre-treated textile material removal of water is preferably by heat, such as by exposure to hot air or to infrared or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed dye and other ingredients of the pre-treatment and dye compositions may be removed from the textile material by a washing sequence, involving a series of hot and cold washes in water and aqueous detergent solutions before the textile material is dried.

According to further aspects of the present invention there are provided textile materials, especially cellulosic textile materials, coloured with any of the ink compositions according to the present invention or by means of the process according to the present invention.

The invention is further illustrated by the following Examples in which all parts and percentages are by weight unless otherwise indicated.

EXAMPLE 1

Preparation of a Compound of Formula (5)

Formula (5)

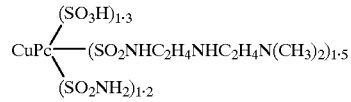

C. I. Reactive Blue 25 (CuPc(SO$_3$H)$_{1.3}$(SO$_2$NHC$_2$H$_4$Cl)$_{1.5}$(SO$_2$NH$_2$)$_{1.2}$ from Zeneca Specialties, England (15.0 g)) was dissolved in water (300 cm$^3$) by addition of 2N NaOH to give a solution of pH 8.0. N,N-dimethylaminoethylamine (15.0 g) was added and the mixture stirred at 70–80° C. for 4 hours.

The mixture was cooled to 50° C. and the pH adjusted to 6.0 by addition of concentrated hydrochloric acid and the product, in free acid form, was filtered off at 25° C. and washed with water (500 cm³).

The product was added to water (300 cm³) and dissolved by addition of 2N sodium hydroxide to give a solution of pH 10. The solution was dialysed to remove chloride ions, screened and evaporated to dryness to give the sodium salt of the compound of Formula (5).

The product was made into an ink by dissolving 2 parts in water/diethylene glycol (92.5/7.5) and printed onto plain paper using a thermal ink jet printer. The product gave bright cyan shades with high water fastness and good light fastness.

EXAMPLE 2

Preparation of a Compound of Formula (6)

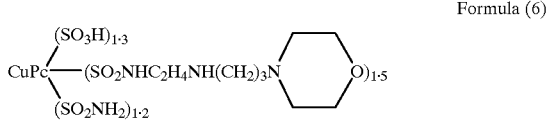

Formula (6)

Example 1 was repeated except that in place of N,N-dimethylaminoethylamine (15 g) there was used N-(3-aminopropyl) morpholine (15 g). The product was converted to the ammonium salt and dialysed, screened evaporated and dried.

When made into an ink by dissolving 2 parts in water/diethylene glycol (92.5/7.5) and printed onto plain paper using a thermal ink jet printer the title product gave bright cyan prints with high water-fastness and good light-fastness.

EXAMPLE 3

Preparation of a Compound of Formula (7)

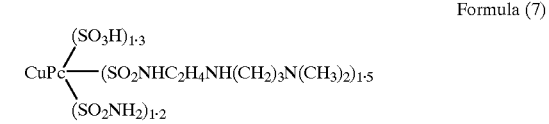

Formula (7)

Example 1 was repeated except that in place of N-N-dimethylaminoethylamine (15 g) there was used 3-N,N-dimethylaminopropylamine (15 g). The sodium salt of the colorant was dialysed, screened, evaporated and dried.

When made into an ink by dissolving 2 g in water/2-pyrrolidone (90/10) and printed on plain paper using a thermal ink jet printer the title product gave bright cyan shades with high water-fastness and good light-fastness.

EXAMPLE 4

Preparation of a Compound of Formula (8)

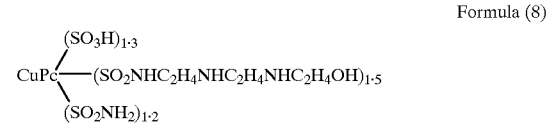

Formula (8)

Example 1 was repeated except that in place of N-N-dimethylaminoethylamine (15 g) there was used N-(2-hydroxyethyl)ethylene diamine (15 g). The sodium salt of the colorant was dialysed, screened, evaporated and dried.

When made into an ink by dissolving 2 parts in water/diethylene glycol (92.5/7.5) and printed onto plain paper using a thermal ink jet printer the title product gave bright cyan prints having high waterfastness and good light fastness.

EXAMPLE 5

Preparation of a Compound of Formula (9)

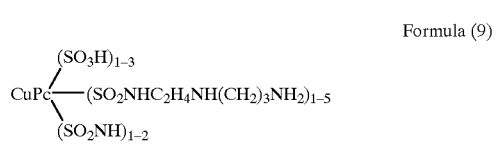

Formula (9)

Example 1 was repeated except that in place of N,N-dimethylaminoethylamine (15 g) there was used 1,3-propylene diamine (15 g). The sodium salt of the colorant was dialysed, screened, evaporated and dried.

When made into an ink by dissolving 2 g in water/2-pyrrolidone (90/10) and printed onto plain paper using a thermal ink jet printer the title product gave bright cyan prints having high water-fastness and good light-fastness.

EXAMPLE 6

Preparation of a Compound of Formula (10)

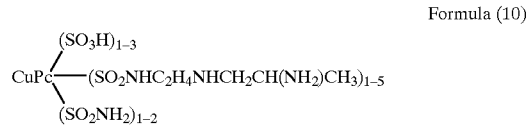

Formula (10)

Example 1 was repeated except that in place of N-N-dimethylaminoethylamine (15 g) there was used 1,2-propylene diamine (15 g). The sodium salt of the colorant was dialysed, screened, evaporated and dried as in Example 1.

When made into an ink by dissolving 2 parts in water/2-pyrrolidone (90/10) and printed onto plain paper using a thermal ink jet printer the title product gave bright cyan prints having high water-fastness and good light-fastness.

EXAMPLE 7

Preparation of a Compound of Formula (11)

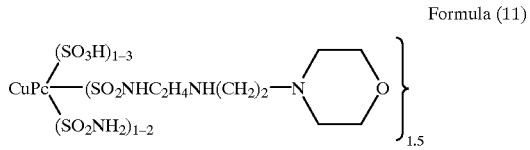

Formula (11)

Example 1 was repeated except that in place of N,N-dimethylaminoethylamine (15 g), there was used N-(2-aminoethyl)-morpholine (15 g). The produce was converted to the ammonium salt and dialysed, screened, evaporated and dried.

When made into an ink by dissolving 2 parts in water/diethylene glycol (92.5/7.5) and printed onto plain paper using a thermal ink jet printer, the title produce gave bright cyan prints with high water fastness and good light fastness.

We claim:

1. A compound of Formula (1) and salts thereof:

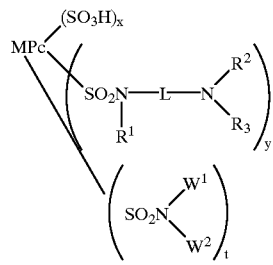

in which:

M is selected from the group consisting of a metal and hydrogen;

Pc is a phthalocyanine nucleus;

$R^1$, $R^2$, $W^1$ and $W^2$ are each independently selected from the group consisting of H, optionally substituted alkyl, optionally substituted alkyl, optionally substituted aryl, and optionally substituted aralkyl;

$R^3$ is an aminoalkyl group of formula —$C_nH_{2n}NR^4R^5$;

Where n is from 2 to 6; and $R^4$ and $R^5$ are selected from the group consisting of:
a. where $R^4$ and $R^5$ are independently selected from a group consisting of: H, optionally substituted alkyl, optionally substituted aryl; and optionally substituted aralkyl; and
b. where $R^4$ and $R^5$, together with the nitrogen atom to which they are attached, form a ring selected from the group consisting of pyridine, piperidine and morpholine;

L is selected from the group consisting of optionally substituted alkylene; optionally substituted aralkylene; and optionally substituted arylene;

x, y and t are each independently 0.5 to 2.5; and (x+y+t) is from 3 to 4;

where the optional substituents are selected from the group consisting of H, $C_{1-4}$alkyl, $C_{1-4}$alkoxy, carboxy, sulpho, —OH, amino, —CN, —NO, and halo.

2. A compound according to claim 1, in which $R^4$ and $R^5$ are each independently selected from the group consisting of H, optionally substituted $C_{1-4}$-alkyl, optionally substituted phenyl, and optionally substituted benzyl.

3. A compound according to claim 1, in which L is selected from the group consisting of optionally substituted $C_{1-6}$ alkylene, optionally substituted $C_{7-11}$ aralkylene, and optionally substituted arylene having up to ten carbon atoms.

4. A compound according to claim 1, in which M is copper.

5. A compound according to claim 1, in which:

x is from 0.8 to 2, y is from 1 to 2 and t is from 0.8 to 2.

6. A compound according to claim 1, in which the sum of (x+y+z) is 4.

7. An ink comprising a compound of Formula (1) or salt thereof according to claim 1 and a liquid medium.

8. An ink according to claim 7, in which is liquid medium comprises water and a water-soluble organic solvent in a weight ratio of 99:1 to 1:99.

9. A process for printing a substrate comprising the step of applying to the substrate with an ink jet printer an ink according to claim 7.

10. A process for the coloration of textile material with an ink according to claim 11, the process comprising:

applying the ink to the textile material by ink jet printing; and heating the textile material at a temperature from 50° C. to 250° C., wherein, said heating the textile material fixes the dye on the material.

11. A substrate selected from the group consisting of a textile material, paper, and an overhead projector slide, wherein the substrate is printed with an ink according to claim 7.

12. A process for the preparation of a colorant of Formula (1) according to claim 1, which comprises condensing, preferably in the presence of a base, a compound of Formula (2);

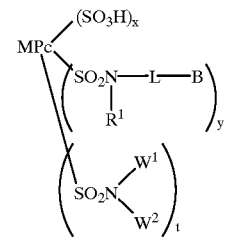

in which: M, Pc, $R^1$, L, $W^1$, $W^2$, x, y and t are as defined in claim 1 and B is selected from the group consisting of halo and —$OSO_3H$;

with a compound of Formula (3):

in which $R^2$ and $R^3$ are as defined in claim 1.

* * * * *